United States Patent [19]

Novotny

[11] 4,074,914
[45] Feb. 21, 1978

[54] HIGH PRESSURE LIGHTWEIGHT FLANGES

[75] Inventor: Rudolph J. Novotny, Stuart, Fla.

[73] Assignee: United Technologies Corporation, Hartford, Conn.

[21] Appl. No.: 599,919

[22] Filed: July 28, 1975

[51] Int. Cl.² .............................................. F16L 23/00
[52] U.S. Cl. ................................ 285/405; 29/156.4 R; 29/526 R; 415/219 R
[58] Field of Search .............. 285/405, 412, 363, 368; 415/219 R; 60/39.31; 403/337; 29/156.4 R, 526

[56] References Cited

U.S. PATENT DOCUMENTS

| 661,506 | 11/1900 | Fisher | 285/363 X |
| 2,384,386 | 9/1945 | Malmberg | 285/363 X |
| 3,152,443 | 10/1964 | Newland | 60/39.31 X |
| 3,387,820 | 6/1968 | Smith | 285/363 X |
| 3,466,070 | 9/1969 | Spencer | 285/405 |
| 3,520,134 | 7/1970 | Cripe et al. | 60/39.65 X |
| 3,644,057 | 2/1972 | Steinbarger | 415/219 X |

FOREIGN PATENT DOCUMENTS 539,039  11/1931  Germany ............................ 285/405

Primary Examiner—Thomas F. Callaghan
Attorney, Agent, or Firm—Jack N. McCarthy

[57] ABSTRACT

A flange construction is provided wherein two members have cooperating annular flanges for connecting them. Said flanges include annular projections which extend axially toward each other and provide for a "snap" engagement between inwardly and outwardly facing circumferentially surfaces on said flanges with bolts extending through said flanges with the bolt heads and nuts extending over an axial line forming an extension of the surfaces forming the "snap" engagement adjacent the bolt.

6 Claims, 4 Drawing Figures

HIGH PRESSURE LIGHTWEIGHT FLANGES

The invention herein described was made in the course of or under a contract or subcontract with the Department of the Air Force.

BACKGROUND OF THE INVENTION

This invention relates to high pressure lightweight flanges, particularly of the type found in aircraft engine construction. Examples of prior art flange arrangements are shown in FIGS. 1 and 2, and flange arrangement use in particular with engine casings are shown in U.S. Pat. Nos. 3,398,881; 3,520,134 and 3,674,497.

SUMMARY OF THE INVENTION

A primary object of the present invention is to provide an improved flange construction having a high pressure, high temperature, and high load capacity which is lighter than the present flanges.

In accordance with the present invention, a flange construction is formed having a "snap" engagement between inwardly and outwardly facing circumferential surfaces between the flanges, with a clamp force being applied so that it extends over a longitudinal line passing through the mating surfaces.

It is an object of this invention to provide a flange construction having two discrete sealing surfaces between cooperating flanges; (1) at the "snap" diameter which is between circumferentially extending surfaces and (2) at the face seal which is between radially extending surfaces.

A further object of this invention is to provide a flange construction for flanges on large diameter members.

DESCRIPTION OF THE PREFERRED EMBODIMENT

Figure 1:
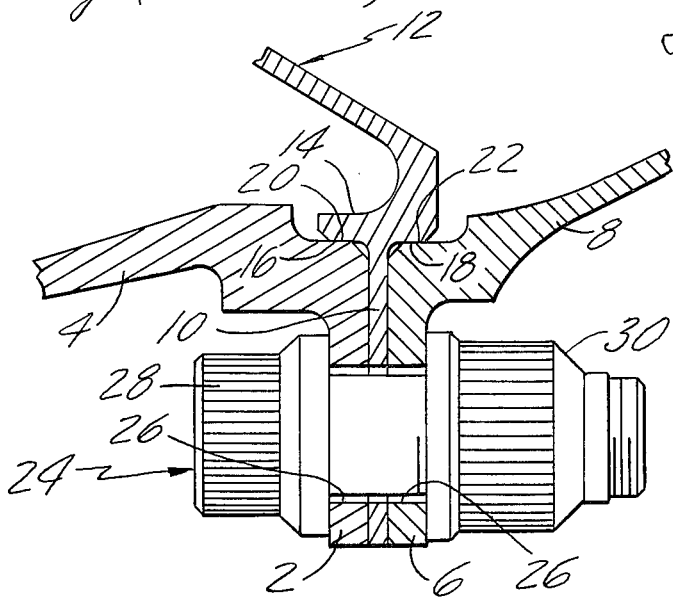
FIG. 1 is a prior art showing of a sectional view of a three-stack flange arrangement.

Referring to FIG. 1 of a prior art arrangement is shown wherein an annular flange 2 on a casing section 4 is connected to an annular flange 6 on a casing section 8 with an annular flange 10 therebetween. Flange 10 extends outwardly from a ring 14 of an inwardly extending member 12. Ring 14 has two outwardly facing annular surfaces 16 and 18, one on each side of flange 10, which have a "snap" engagement with the inwardly facing inner surfaces 20 and 22 of the annular flanges 2 and 6, respectively. A "snap" engagement refers to an interference fit where an inner annular surface has at least the same diameter as the outer annular surface of a pair of mating annular surfaces. In flanges built, a 0.005 inch interference was used. Bolts 24 extent through aligned openings 26 in the flanges 2, 6 and 10 to hold the flanges together. The size and number of bolts are arrived at by analytical means based on forces acting through casing sections 4 and 8. The inner surface of each bolt head 28 engages the flange 2 while the inner surface of each cooperating nut 30 engages the flange 6.

Figure 3:
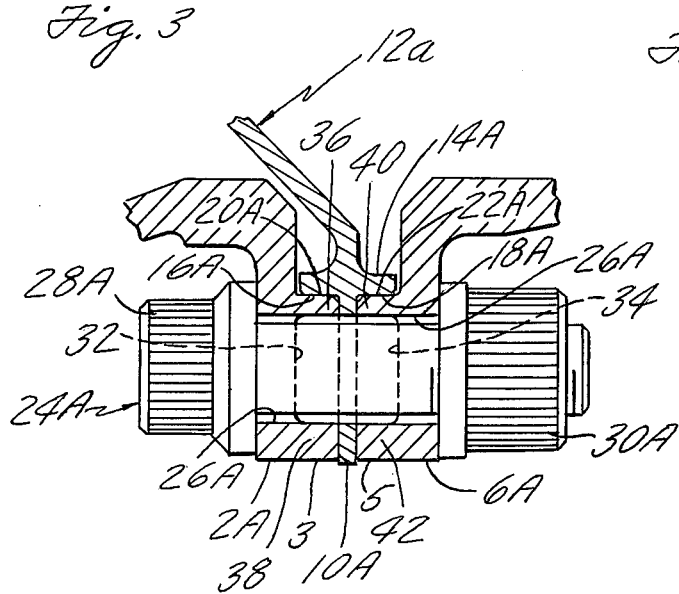
FIG. 3 is a sectional view of a three-stack flange arrangement made in accordance with the present invention.

Referring now to FIG. 3, a three-stack flange arrangement made in accordance with the present invention is shown. Each annular flange 2A and 6A has an enlarged annular end portion 3 and 5, respectively, at the end thereof projecting toward each other. An annular flange 10A is located between the portions 3 and 5. The flange 10A extends outwardly from a ring 14A of inwardly extending member 12A. The ring 14A has two outer annular surfaces 16A and 18A, one on each side of flange 10A, which have a "snap" engagement with inner annular surfaces 20A and 22A, which is the inner surface of the annular end portions 3 and 5, respectively, of the annular flanges 2A and 6A.

Each flange 2A and 6A is formed having an annular groove, or under-cut portion, 32 and 34, located respectively in annular end portions 3 and 5. Annular groove 32 forms two annular axially extending flanges 36 and 38 extending from flange 2A towards the cooperating surface of the flange 10A, and annular groove 34 forms two annular axially extending flanges 40 and 42 extending from flange 6A towards the other cooperating surface of the flange 10A. Bolts 24A extend through aligned openings 26A in the flanges 2A, 6A and 10A to hold the flanges together. The inner surface of each bolt head 28A engages the flange 2A while the inner surface of each cooperating nut 30A engages the flange 6A.

In this construction shown in FIG. 3, the annular axially extending flanges 36 and 38 are made longer than the axial length of the part of 14A on which annular surface 16A is formed, and the annular axially extending flanges 40 and 42 are made longer than the axial length of the part of 14A on which the annular surface 18A is formed. Further, the diametral extent of each bolt head 28A and nut 30A positions the bolt head and nut over a line forming an extension of the annular engaging surfaces 16A and 20A, and 18A and 22A adjacent the bolt. It can be seen that when the bolts 24A are tightened, the annular flanges 36, 38 and 40, 42 are brought to bear against the mating surface of flange 10A, forming sealing surfaces. It is also noted that with the bolt heads 28A and nuts 30A extending over the "snap" engagement line, bending of the flanges 2A and 6A will be restricted to a minimum providing for good sealing at the "snap" engagement line.

Figure 2:
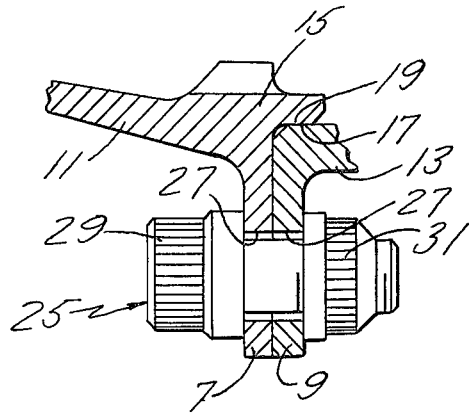
FIG. 2 is a prior art showing of a sectional view of a two-stack flange arrangement.

Referring to FIG. 2, a prior art arrangement is shown wherein the annular flange 7 on a casing section 11 is connected to an annular flange 9 on a casing section 13. Flange 7 has an axially extending annular flange 15 extending away from the casing section 11. Annular flange 15 has an outwardly facing annular surface 17 which has a "snap" engagement with an inwardly facing surface 19 of the annular flange 9. Bolts 25 extend through aligned openings 27 in the flanges 7 and 9 to hold the flanges together. The inner surface of each bolt head 29 engages the flange 7 while the inner surface of each cooperating nut 31 engages the flange 9.

Figure 4:
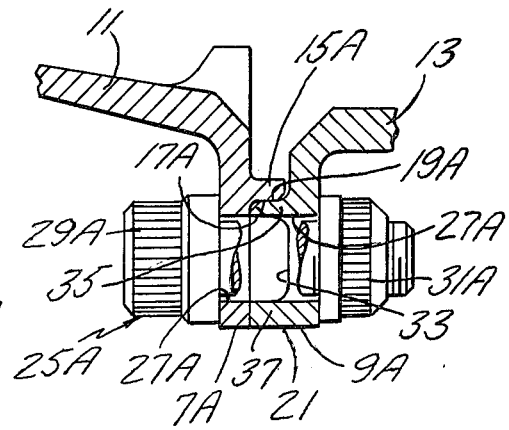
FIG. 4 is a sectional view of a two-stack flange arrangement made in accordance with the present invention.

Referring now to FIG. 4, a two-stack flange arrangement made in accordance with the present invention is shown. Annular flange 7A is formed having an annular axially extending flange 15A projecting toward annular flange 9A, and annular flange 9A has an annular axially extending flange means 21 projecting towards said annular flange means 7A. Flange 15A has an outer annular surface 17A which has a "snap" engagement with an inner annular surface 19A on the annular axially extending flange means 21.

Flange 9A is formed having an annular groove, or under-cut portion 33. Annular groove 33 forms two annular axially extending flanges 35 and 37 extending from flange 9A towards the cooperating surface of the flange 7A. Bolts 25A extend through aligned openings 27A to hold the flanges together. The outer surface of each bolt head 29A engages the flange 7A while the inner surface of each cooperating nut 31A engages the flange 9A.

In this construction shown in FIG. 4, the annular axially extending flanges 35 and 37 are made longer than the axial length of the annular axially extending flange 15A. Further, the diametric extent of each bolt head 29A and nut 31A positions the bolt head and nut over a line forming an extension of the annular engaging surfaces 17A and 19A adjacent the bolt. It can be seen that when the bolts 25A are tightened, the annular flanges 35 and 37 are brought to bear against the mating surface of flange 7A, forming sealing surfaces. It is also noted that with the bolt heads 29A and nuts 31A extending over the "snap" engagement line, bending of the flanges 7A and 9A will be restricted to a minimum providing for good sealing at the "snap" engagement line.

I claim:

1. A flange construction comprising a first member, said first member having a first radially extending annular flange on one end thereof, a second member, said second member having a second radially extending annular flange on one end thereof, said first radially extending annular flange having an annular axially extending outer surface located inwardly from the outer edge of said flange, said second radially extending annular flange having an annular axially extending flange means located radially outwardly of said outer surface, said annular axially extending flange means of said second flange having an annular axially extending inner surface, said outer surface and inner surface being formed to have an interference or "snap" engagement fit, said annular axially extending flange means comprising two axially extending flanges both of which are located radially outwardly of said outer surface, said two axially extending flanges having a length so that the ends of the two axially extending flanges will engage said first flange, means for clamping said first flange to said second flange so that a clamping force extends along a longitudinal line passing through the mating outer surface and inner surface.

2. A combination as set forth in claim 1 wherein said means for clamping includes bolt means spaced around the first annular flange and second annular flange, each of said bolt means extending through said flanges, each of said bolt means having a bolt head adjacent one of said annular flanges and a nut adjacent the other of said annular flanges, said head and nut of each bolt means extending over an axial line passing along the mating outer surface of said first radially extending annular flange and the inner surface of said annular axially extending flange means of said second radially extending annular flange adjacent the bolt means.

3. A combination as set forth in claim 2 wherein each bolt means has a bolt which extends between the two axially extending flanges of said second flange.

4. A combination as set forth in claim 1 wherein said annular axially extending outer surface is located on a third axially extending flange extending away from said first radially extending annular flange, said third axially extending flange having a length less than that of the two axially extending flanges of said flange means of said second radially extending annular flange.

5. A method of forming connection means comprising two radial flanges including the steps of:
 1. forming a first radially extending annular flange,
 2. forming a second radially extending annular flange,
 3. forming said first radially extending flange with an annular axially extending outer surface,
 4. forming said second radially extending flange with an annular axially extending flange means radially outward of said annular axially extending outer surface of said first radially extending annular flange,
 5. forming the outer surface of said first radially extending annular flange and the inner surface of said annular axially extending flange means of said second radially extending annular flange so that they have an interference or "snap" engagement fit,
 6. forming said annular axially extending flange means with an annular groove in the end thereof thereby forming two axially extending flanges both of which are located radially outwardly of said outer surface,
 7. placing said first radially extending annular flange adjacent said second radially extending annular flange with said outer surface of said annular axially extending flange engaging the inner surface of said annular axially extending flange means with an interference or "snap" engagement fit,
 8. clamping said first radially extending annular flange to said second radially extending annular flange at a plurality of locations so that at each location a clamping force extends through a longitudinal line passing along the mating outer surface of said first radially extending annular flange and the inner surface of said annular axially extending flange means of said second radially extending annular flange, and said two axially extending flanges of said flange means engages said first radially extending annular flange.

6. A method of forming connection means comprising two radial flanges including the steps of:
 1. forming a first radially extending annular flange,
 2. forming a second radially extending annular flange,
 3. forming said first radially extending flange with an annular axially extending outer surface,
 4. forming said second radially extending flange with an annular axially extending flange means radially outward of said annular axially extending outer surface of said first radially extending annular flange,
 5. forming the outer surface of said first radially extending annular flange and the inner surface of said annular axially extending flange means of said second radially extending annular flange so that they have an interference fit "snap" engagement fit,
 6. forming said annular axially extending flange means with an annular groove in the end thereof thereby forming two axially extending flanges both of which are located radially outwardly of said outer surface,
 7. forming a plurality of holes through the second radially extending annular flange between said two axially extending flanges,
 8. forming a plurality of holes in said first radially extending annular flange so as to be axially aligned with the holes in said second radially extending annular flange, 9. placing said first radially extending annular flange adjacent said second radially extending annular flange with said outer surface engaging the inner surface of said annular axially extending flange means with an interference or "snap" engagement fit and aligning the holes of said second radially extending annular flange with those in said first radially extending annular flange, 10. placing bolt means through each of the aligned openings of said first radially extending annular flange and said second radially extending annular flange, 11. forming the head and nut of each of said bolt means so that they extend over an axial line passing along the mating outer surface of said first radially extending annular flange and the inner surface of said annular axially extending flange means of said second radially extending annular flange adjacent the bolt means, 12. tightening said bolt means so that said two axially extending flanges of said flange means engages said first radially extending annular flange.

* * * * *

UNITED STATES PATENT OFFICE
CERTIFICATE OF CORRECTION

PATENT NO. : 4,074,914
DATED : February 21, 1978
INVENTOR(S) : RUDOLPH J. NOVOTNY It is certified that error appears in the above-identified patent and that said Letters Patent are hereby corrected as shown below:

Column 1, line 51: after "Fig. 1" delete "of".

Column 1, line 64: after "24" change "extent" to read -- extend --.

Signed and Sealed this

Thirtieth Day of May 1978

[SEAL]

Attest:

RUTH C. MASON
Attesting Officer

LUTRELLE F. PARKER
Acting Commissioner of Patents and Trademarks